(12) United States Patent
Nikic et al.

(10) Patent No.: US 9,245,170 B1
(45) Date of Patent: Jan. 26, 2016

(54) POINT CLOUD DATA CLUSTERING AND CLASSIFICATION USING IMPLICIT GEOMETRY REPRESENTATION

(75) Inventors: Dejan Nikic, Seattle, WA (US);
Yuan-Jye Jason Wu, Issaquah, WA (US)

(73) Assignee: THE BOEING COMPANY, Chicago, IL (US)

(*) Notice: Subject to any disclaimer, the term of this patent is extended or adjusted under 35 U.S.C. 154(b) by 242 days.

(21) Appl. No.: 13/534,499

(22) Filed: Jun. 27, 2012

(51) Int. Cl.
G06K 9/00 (2006.01)
G06K 9/62 (2006.01)

(52) U.S. Cl.
CPC .......... *G06K 9/00201* (2013.01); *G06K 9/6218* (2013.01); *G06T 2207/10028* (2013.01)

(58) Field of Classification Search
None
See application file for complete search history.

(56) References Cited

U.S. PATENT DOCUMENTS

| 5,754,704 | A | 5/1998 | Barnsley et al. | |
|---|---|---|---|---|
| 5,905,507 | A | 5/1999 | Rossignac et al. | |
| 5,933,193 | A | 8/1999 | Niesen | |
| 5,936,669 | A | 8/1999 | Niesen | |
| 6,603,470 | B1 | 8/2003 | Deering | |
| 6,678,394 | B1* | 1/2004 | Nichani | 382/103 |
| 7,352,368 | B2 | 4/2008 | Frazelle et al. | |
| 7,542,036 | B2 | 6/2009 | Museth et al. | |
| 7,995,055 | B1* | 8/2011 | Ma et al. | 345/420 |
| 8,179,393 | B2 | 5/2012 | Minear et al. | |
| 8,294,754 | B2 | 10/2012 | Jung et al. | |
| 8,483,478 | B1* | 7/2013 | Medasani et al. | 382/154 |
| 8,553,989 | B1* | 10/2013 | Owechko et al. | 382/224 |
| 2004/0105573 | A1* | 6/2004 | Neumann et al. | 382/103 |
| 2005/0223337 | A1* | 10/2005 | Wheeler et al. | 715/806 |
| 2005/0243083 | A1 | 11/2005 | Frazelle et al. | |
| 2006/0012597 | A1* | 1/2006 | Chakraborty | 345/419 |
| 2006/0018563 | A1* | 1/2006 | Ruggiero | 382/300 |
| 2006/0294144 | A1 | 12/2006 | Shin | |
| 2007/0024620 | A1* | 2/2007 | Muller-Fischer et al. | 345/427 |
| 2007/0076090 | A1* | 4/2007 | Alexander | 348/47 |
| 2007/0229493 | A1* | 10/2007 | Tubaro et al. | 345/419 |
| 2009/0196510 | A1 | 8/2009 | Gokturk et al. | |
| 2010/0225740 | A1 | 9/2010 | Jung et al. | |
| 2010/0239178 | A1* | 9/2010 | Osher et al. | 382/243 |
| 2010/0278418 | A1* | 11/2010 | Chang et al. | 382/152 |
| 2011/0115783 | A1* | 5/2011 | Janson | 345/419 |
| 2011/0115812 | A1 | 5/2011 | Minear et al. | |

OTHER PUBLICATIONS

Woo, H., E. Kang, Semyung Wang, and Kwan H. Lee. "A new segmentation method for point cloud data." International Journal of Machine Tools and Manufacture 42, No. 2 (Jan. 2002): 167-178.*

(Continued)

*Primary Examiner* — Sumati Lefkowitz
*Assistant Examiner* — Carol Wang
(74) *Attorney, Agent, or Firm* — Yee & Associates, P.C.

(57) ABSTRACT

An image processing system comprising a data repository and an image processor. The data repository is configured to store image data. The image processor is configured to place the image data into a three-dimensional mesh. The image processor is further configured to identify vectors of the image data in the three-dimensional mesh. The image processor is further configured to identify a number of clusters in the vectors of the image data in the three-dimensional mesh.

20 Claims, 10 Drawing Sheets

(56) References Cited

OTHER PUBLICATIONS

Himmelsbach, Michael, Thorsten Luettel, and H. Wuensche. "Real-time object classification in 3D point clouds using point feature histograms." In Intelligent Robots and Systems, 2009. IEEE/RSJ International Conference on, pp. 994-1000. (Oct. 10, 2009).*

Rusu, Radu Bogdan, Nico Blodow, Zoltan Csaba Marton, and Michael Beetz. "Close-range scene segmentation and reconstruction of 3D point cloud maps for mobile manipulation in domestic environments." In Intelligent Robots and Systems, 2009. IROS 2009. IEEE/RSJ International Conference on, pp. 1-6. IEEE, 2009.*

Zhao et al., "Fast surface reconstruction using the level set method", IEEE Workshop on Variational and Level Set Methods in Computer Vision, 2001, pp. 194-201.

Chan et al., "A level set algorithm for minimizing the Mumford-Shah functional in image processing", IEEE Workshop on Variational and Level Set Methods in Computer Vision, 2001, pp. 161-168.

Wu et al., "Spatial Data Compression Using Implicit Geometry," U.S. Appl. No. 12/711,931, filed Feb. 24, 2010, 60 Pages.

Notice of Allowance, dated Mar. 15, 2013, regarding U.S. Appl. No. 12/711,931, 11 pages.

USPTO Office Action, dated Dec. 7, 2012, regarding U.S. Appl. No. 12/711,931, 16 pages.

Duan, "Implicit Geometry," http://people.cs.missouri.edu/~duanye/cs8690/lecture-notes/3a-implicit-geometry.pdf, Accessed Sep. 9, 2014, 63 pages.

\* cited by examiner

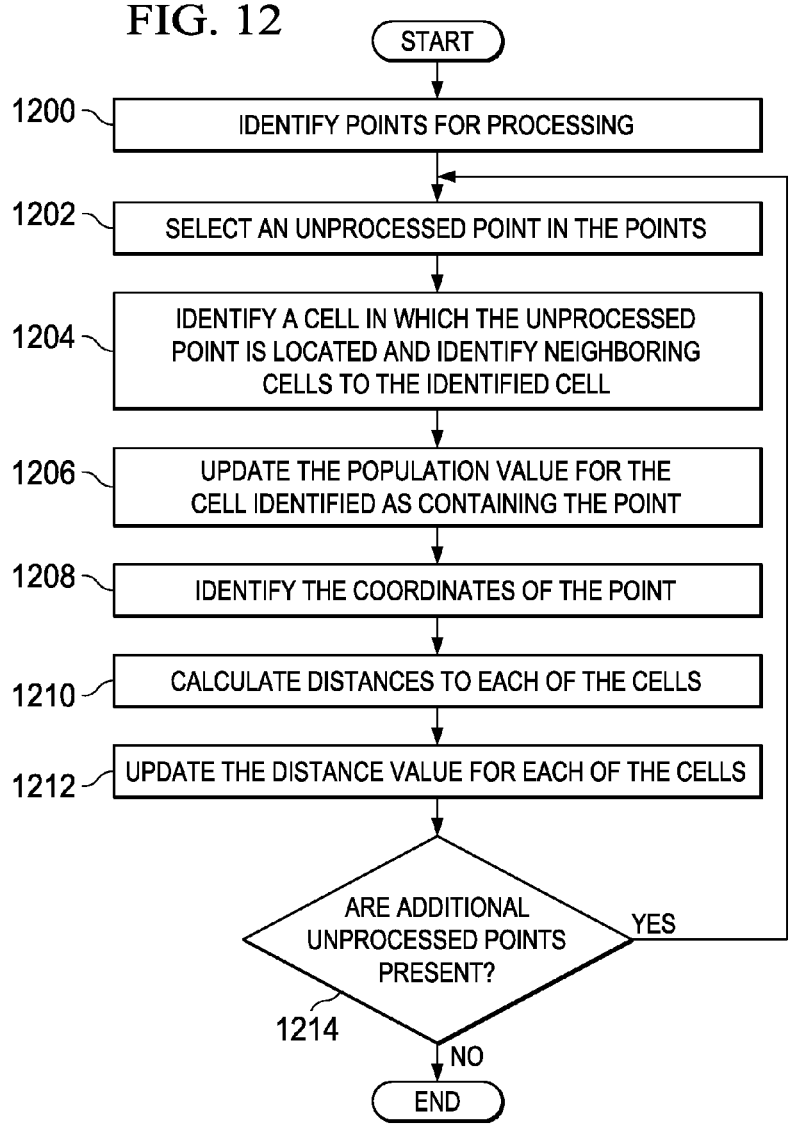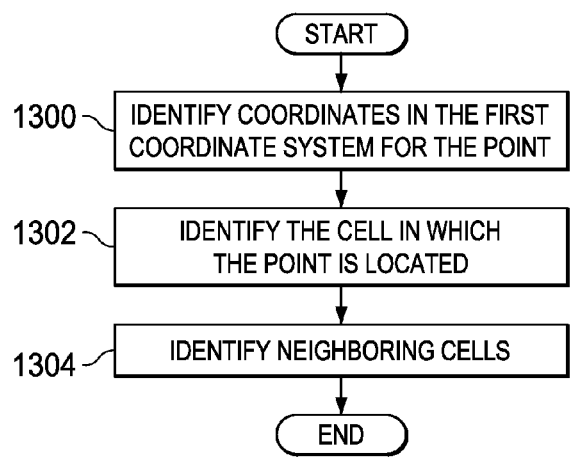

FIG. 14
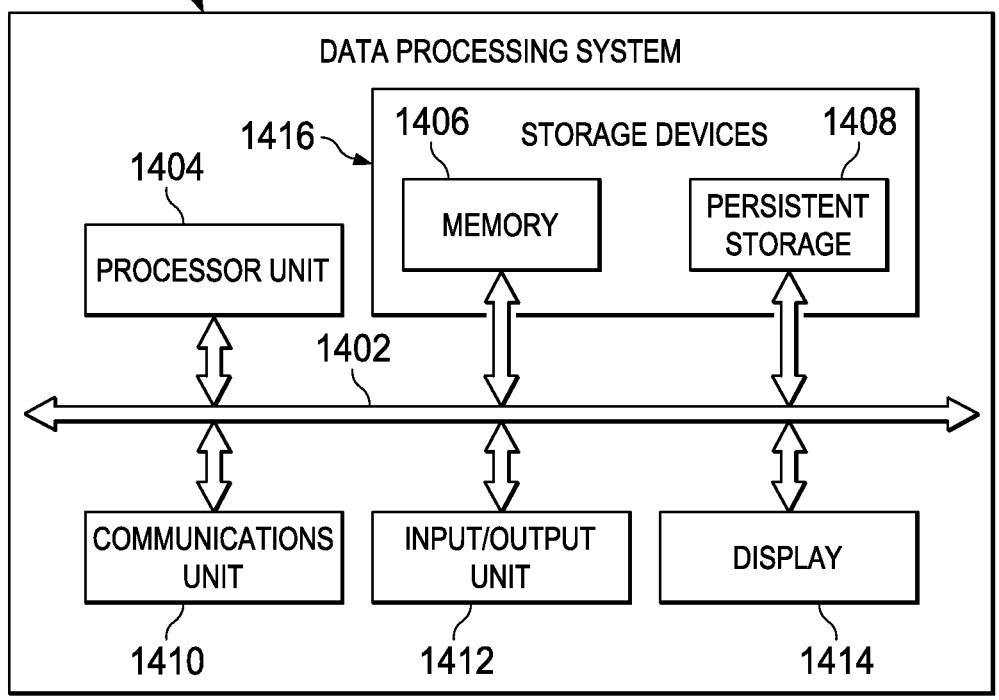
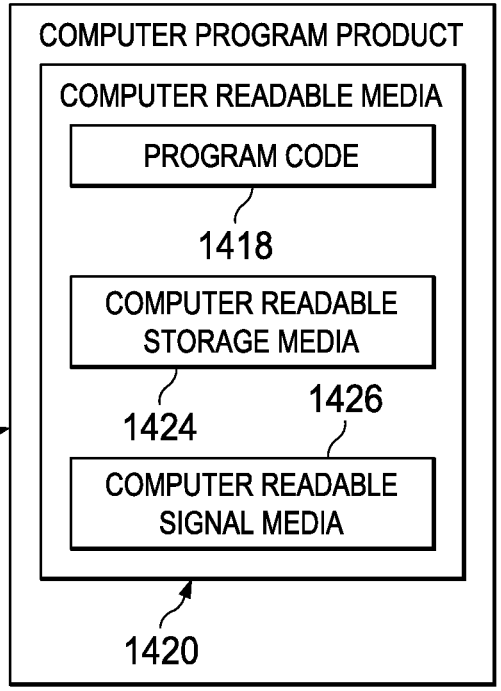

POINT CLOUD DATA CLUSTERING AND CLASSIFICATION USING IMPLICIT GEOMETRY REPRESENTATION

GOVERNMENT LICENSE RIGHTS

This application was made with United States Government support under contract number HM1582-10-C-0011 awarded by the National Geospatial Intelligence Agency (NGA). The United States Government has certain rights in this application.

CROSS-REFERENCE TO RELATED APPLICATION

This application is related to patent application U.S. Ser. No. 12/711,931, filed Feb. 24, 2010, entitled "Spatial Data Compression Using Implicit Geometry," which is incorporated herein by reference.

BACKGROUND INFORMATION

1. Field

The present disclosure relates generally to classifying image data and, in particular, to a method and apparatus for clustering data in a point cloud. Still more particularly, the present disclosure relates to a method and apparatus for classifying groups of image data in a point cloud.

2. Background

Manned and unmanned aerial vehicles, ground vehicles, or both may be used to gather data. In particular, vehicles and other platforms may gather data about a scene. Various objects may be present in the scene. This data may take various forms. In some cases, an aerial vehicle may use a visible light camera, an infrared camera, and other cameras to generate image data about the scene. Specifically, the image data may be generated for particular objects in the scene.

In some cases, an aerial vehicle may generate image data for the scene in the form of a point cloud. The point cloud is a set of points in a three-dimensional coordinate system. Each point has a three-dimensional coordinate and may also include other information. The aerial vehicle may use a three-dimensional scanner to generate image data for the point cloud. The three-dimensional scanner may identify points for objects in the scene.

For example, a light detection and ranging (LIDAR) system may be used to generate image data for the point cloud of the scene. In another example, a laser detection and ranging (LADAR) system may be used to generate image data for the scene. This type of system also may be referred to as a light detection and ranging (LIDAR) system. These LIDAR and LADAR may be used interchangeably.

Processing the image data for the point cloud may be more time consuming than desired and also may require more processing power than desired. For example, a point cloud for a scene may include millions of points that form the image data for the point cloud. Processing the point cloud to identify objects in the point cloud may take more time and processing power than desired.

Processing the point cloud to identify objects may not occur as quickly as desired. The time needed to identify objects may be more important when a particular mission involves quickly changing situations. For example, when surveillance is performed on location having one or more targets of interest, identifying moving objects or objects that may potentially move may not occur as quickly as desired in processing a point cloud of the scene.

In another example, if the mission is for fire-fighting in a forest or other location, advancement of flames, locations of fire fighters, and other ground assets may not be identified as quickly as needed to perform a mission using the point cloud. Also, a need for real-time or near-real-time identification of targets of interest and other related information, and more detailed layering of such information is often needed. Despite these needs, known mapping and surveillance systems and capabilities may not enable the speed, resolution, or more detailed layers of information required for ever more demanding applications.

Therefore, it would be desirable to have a method and apparatus that takes into account at least some of the issues discussed above as well as possibly other issues.

SUMMARY

In one illustrative embodiment, an image processing system comprises a data repository and an image processor. The data repository is configured to store image data. The image processor is configured to place the image data into a three-dimensional mesh. The image processor is further configured to identify vectors of the image data in the three-dimensional mesh. The image processor is further configured to identify a number of clusters in the vectors of the image data in the three-dimensional mesh.

In another illustrative embodiment, a method for processing image data is present. The image data is placed, by an image processor, into a three-dimensional mesh. The vectors of the image data in the three-dimensional mesh are identified by the image processor. A number of clusters are identified in the vectors of the image data in the three-dimensional mesh.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 12 is an illustration of a flowchart of a process for generating implicit geometry data in accordance with an illustrative embodiment;

FIG. 13 is an illustration of a flowchart of a process for identifying a cell in which a point is located and any neighboring cells to the cell in which the point is located in accordance with an illustrative embodiment; and FIG. 14 is an illustration of a block diagram of a data processing system in accordance with an illustrative embodiment.

DETAILED DESCRIPTION

The illustrative examples recognize and take into account one or more different considerations. For example, the illustrative embodiments recognize and take into account that currently used systems for processing image data in a point cloud involve processing the entire point cloud to identify relationships between different points to each other.

After the relationships between points have been identified, the point cloud may then be processed to identify particular objects or a number of objects. As used herein, "number of" when used with reference to an item means one or more items. For example, the number of objects is one or more objects.

In other words, currently used systems may identify a point in a scene, but the relationship of other points in the scene to the identified point may be unknown. All of the image data for the point cloud are processed to identify other points that may be around the point of interest. This processing occurs each time one or more points of interest are identified. The illustrative embodiments recognize and take into account that this process takes more time than desired to process a point cloud.

Thus, the illustrative embodiments provide a method and apparatus for processing image data. In particular, the illustrative embodiments provide a method and apparatus for processing image data for a point cloud. One or more illustrative embodiments provide an image processing system comprising a data repository and an image processor. The data repository is configured to restore data. The image processor is configured to place the image data into a three-dimensional mesh. The image processor also identifies vectors of the image data in the three-dimensional mesh and identifies a number of clusters in the vectors of the image data in the three-dimensional mesh.

This clustering process of the image data may then be used to perform further processing of the image data. For example, the number of clusters may then be associated with types of objects. Then, the types of objects may be identified and used to perform classification with new image data. In other words, clustering data may be used as training data to train a classifier to perform classification with new image data. As the amount of training data increases, the accuracy at which new image data may be classified may increase.

Figure 1:
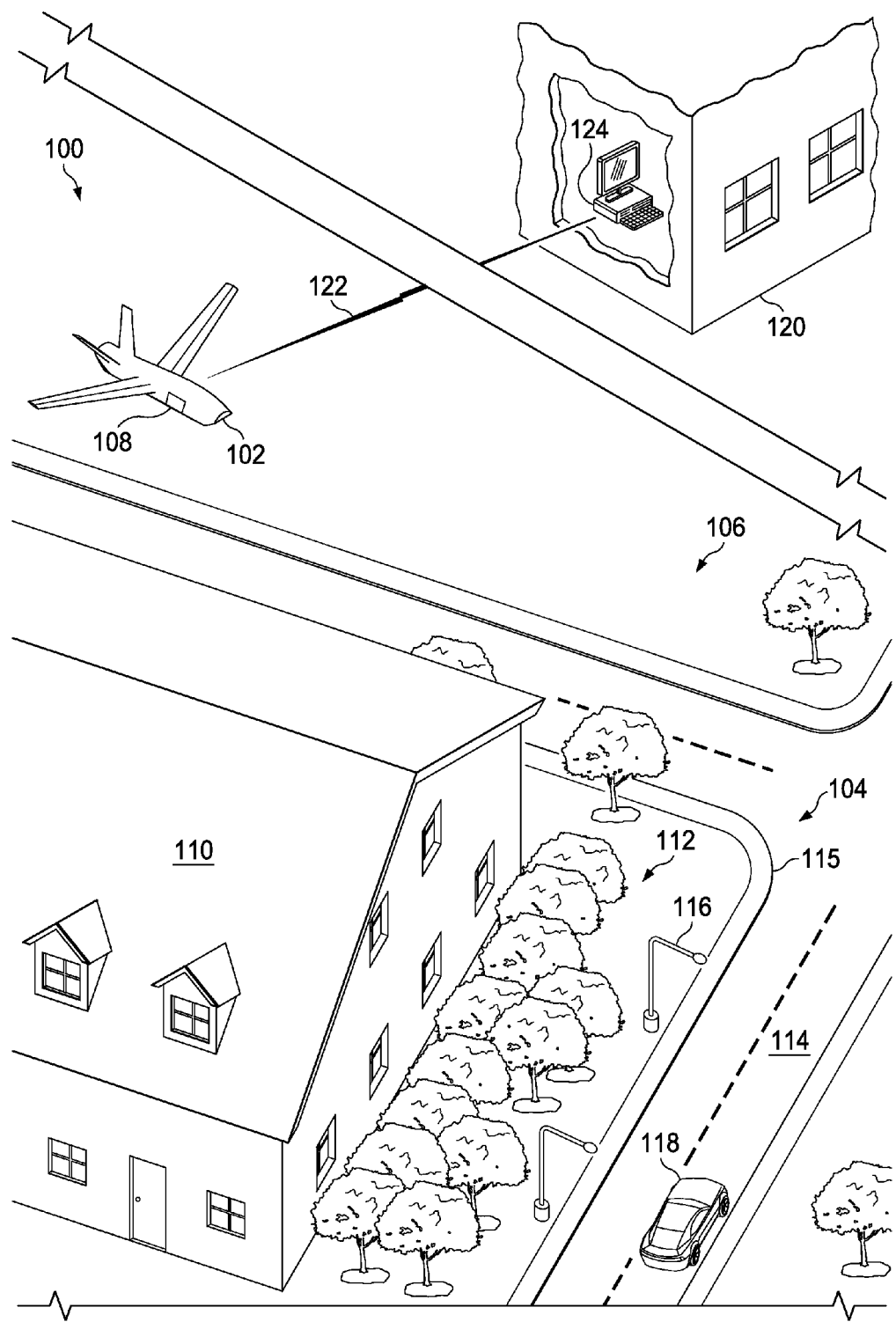
FIG. 1 is an illustration of an imaging environment in accordance with an illustrative embodiment.

With reference now to the figures, and in particular, with reference to FIG. 1, an illustration of an imaging environment is depicted in accordance with an illustrative embodiment. In this depicted example, imaging environment 100 includes unmanned aerial vehicle 102. Unmanned aerial vehicle 102 is an example of a platform that may gather data about objects 104 or a number of objects 104 in scene 106.

In these illustrative examples, unmanned aerial vehicle 102 generates image data about objects 104 or a number of objects 104 using imaging system 108. In particular, imaging system 108 may be, for example, a light detection and ranging (LIDAR) system. Of course, imaging system 108 may be implemented using another suitable type of imaging system. In this illustrative example, imaging system 108 generates image data for a point cloud of objects 104 or the number of objects 104 in scene 106.

As depicted, the number of objects 104 in scene 106 include house 110, trees 112, road 114, pathway 115, light poles 116, and vehicle 118. In these illustrative examples, the image data generated by imaging system 108 may take the form of image data for a point cloud of scene 106. Each point in the image data may include information about the light detected by imaging system 108 defined by three-dimensional coordinates of the point.

Unmanned aerial vehicle 102 sends the image data generated by imaging system 108 to ground station 120 over wireless communications link 122. Computer system 124 at ground station 120 processes the image data. In these illustrative examples, computer system 124 processes the image data in a manner that allows for processing of the image data for objects 104 in scene 106 more quickly than currently occurs when the image data is a point cloud.

Figure 2:
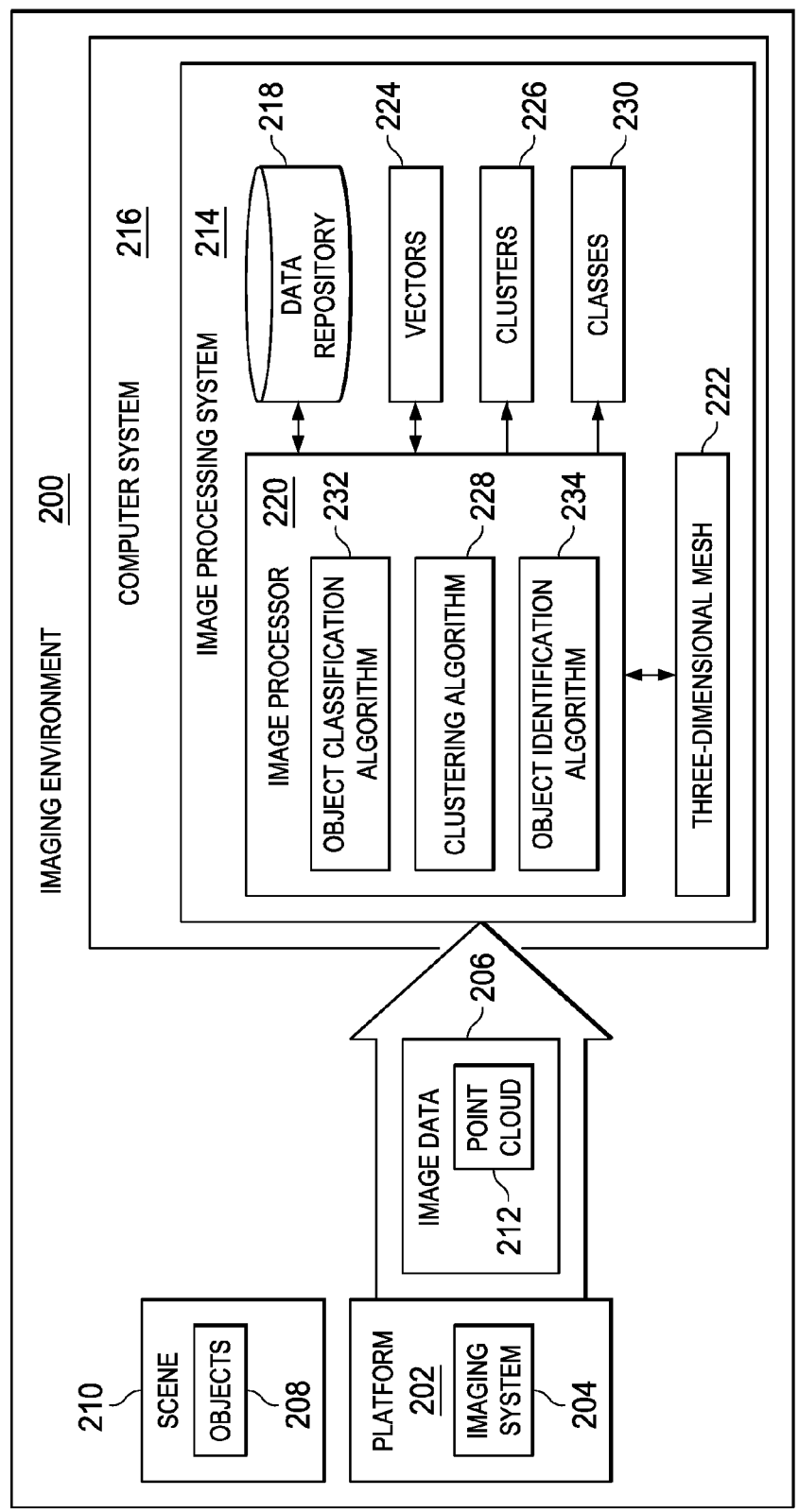
FIG. 2 is an illustration of a block diagram of an imaging environment in accordance with an illustrative embodiment.

Turning now to FIG. 2, an illustration of a block diagram of an imaging environment is depicted in accordance with an illustrative embodiment. In this depicted example, imaging environment 100 is an example of one implementation of imaging environment 200 shown in block form in FIG. 2.

Platform 202 is present in imaging environment 200. In these illustrative examples, platform 202 may include imaging system 204. Imaging system 204 may be used to generate image data 206 about objects 208 in scene 210. In these illustrative examples, image data 206 may take the form of point cloud 212.

Imaging system 204 may be implemented using a number of different types of sensors or devices. For example, imaging system 204 may include at least one of a light detection and ranging (LIDAR) system, a laser detection and ranging (LADAR) system, and other suitable types of imaging systems. Of course, any device may be used that is configured to generate image data 206 in the form of point cloud 212. Light detection and ranging (LIDAR) systems and laser detection and ranging (LADAR) systems may incorporate adjustable wavelength illuminators such as lasers and/or other light sources, and incoherent and coherent scanners and detectors and sensors. Such illuminators and/or detectors and sensors also may incorporate one or more direct and backscattering imaging and data collection techniques. These techniques may be, for example, fluorescence, Rayleigh, Mie, Raman scattering, and other suitable techniques.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

In this illustrative example, image data 206 is received by image processing system 214 for processing. In these illustrative examples, image processing system 214 is hardware and may include software. Image processing system 214 may be implemented in, for example, computer system 216. Computer system 216 includes one or more computers. When more than one computer is present, those computers may be in communication with each other over a communications medium such as a network.

In particular, image data 206 may be stored in data repository 218 in image processing system 214. Data repository 218 is one or more storage devices in computer system 216 in this illustrative example. These storage devices may include devices selected from, for example, without limitation, at least one of a hard disk drive, a solid-state disk drive, a random access memory, and other suitable types of storage devices.

Image data 206 is processed by image processor 220. Image processor 220 may be implemented using hardware, software, or a combination of the two. When software is used, the operations performed by image processor 220 may be implemented in program code configured to be run on a processor unit. When hardware is employed, the hardware may include circuits that operate to perform the operations in image processor 220.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform a number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In these illustrative examples, image processor 220 places image data 206 into three-dimensional mesh 222. Three-dimensional mesh 222 is a data structure in these illustrative examples. Image processor 220 also identifies vectors 224 in three-dimensional mesh 222. In these illustrative examples, vectors 224 are vectors of image data 206 within three-dimensional mesh 222. Image processor 220 then identifies a number of clusters 226 in vectors 224 of image data 206 in three-dimensional mesh 222.

The generation of the number of clusters 226 may be performed in a number of different ways. For example, image processor 220 may employ clustering algorithm 228. Any currently used clustering algorithm may be used in clustering algorithm 228. For example, clustering algorithm 228 may be selected from one of a k-means clustering algorithm, a hierarchical clustering algorithm, a bi-clustering algorithm, and an expectation-maximization algorithm.

Further, in some illustrative examples, image processor 220 or some other component may identify objects 208 in clusters 226. This identification may be made using object identification algorithm 234. Object identification algorithm 234 may be implemented using any algorithm that is configured to identify objects as particular types of objects and supply labels for the objects. For example, object identification algorithm 234 in image processor 220 may identify an object in objects 208 in clusters 226 as a building, a car, a road, or some other type of object.

As depicted, data about the objects identified by object identification algorithm 232 in clusters 226 may be used to build a classifier for new image data. The classifier may be object classification algorithm 232. A number of classes 230 may be identified using object classification algorithm 232. Object classification algorithm 232 may be implemented using any classification algorithm that is configured to place similar objects into the same class.

In these illustrative examples, classes 230 may be comprised of a single cluster or a set of clusters. As used herein, a "set of" items means one or more items. For example, a set of clusters may comprise one or more clusters. As an example, a first class may comprise a union of two clusters. In other illustrative examples, a second class may comprise a union of five clusters. In yet another example, a third class may comprise a single cluster. Of course, other numbers of clusters may comprise a class within classes 230.

When a second set of image data from a scene is received, image processor 220 identifies vectors 224 in three-dimensional mesh 222. By comparing the second set of vectors generated for the second set of point cloud data with the classes in classes 230, object classification algorithm 232 may classify the vectors in the second set of vectors.

For example, if the second set of vectors is similar to the features of the class for a tree, the second set of vectors belongs in that class. Object classification algorithm 232 places the second set of vectors into one or more classes having features that are most similar to the vectors in the second set of vectors.

With the use of clustering algorithm 228, object classification algorithm 232, and object identification algorithm 234, image processor 220 may build a classifier to classify future data. As a result, image data 206 may be processed more quickly and accurately.

Figure 3:
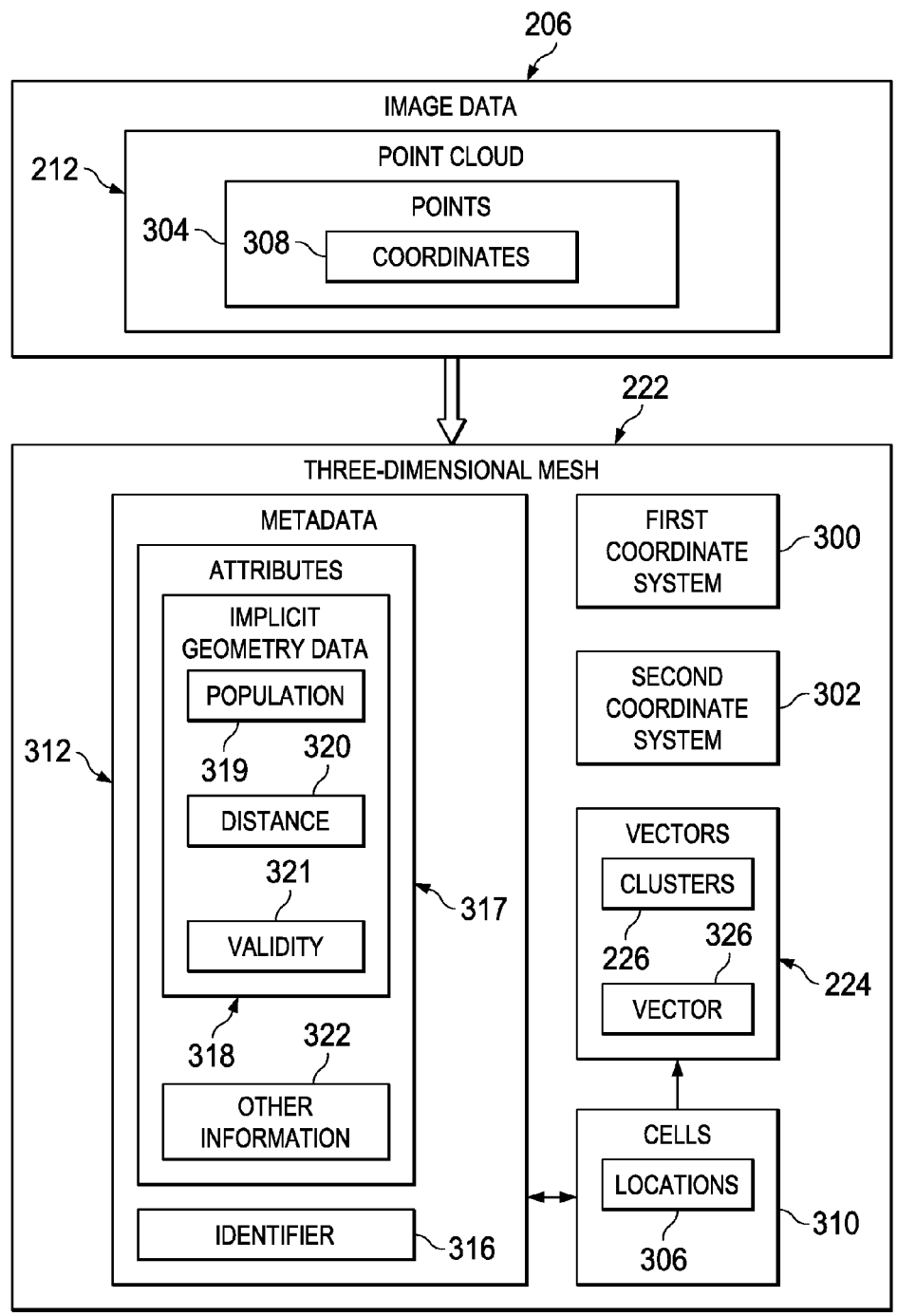
FIG. 3 is an illustration of a block diagram of image data and a three-dimensional mesh in accordance with an illustrative embodiment.

Turning now to FIG. 3, an illustration of a block diagram of image data and a three-dimensional mesh is depicted in accordance with an illustrative embodiment. As depicted, image data 206 may be placed into three-dimensional mesh 222.

In this illustrative example, image data 206 is in first coordinate system 300. Three-dimensional mesh 222 may use both first coordinate system 300 and second coordinate system 302. Points 304 in point cloud 212 for image data 206 are described using first coordinate system 300 and have locations based on first coordinate system 300 in three-dimensional mesh 222.

First coordinate system 300 describes where a particular point in points 304 is located in three-dimensional mesh 222. In particular, coordinates 308 may be used to identify a particular location within a cell. In contrast, second coordinate system 302 is a less granular coordinate system and identifies locations of cells relative to each other.

In other words, the location of a point in points 304 may be described using first coordinate system 300 within three dimensional mesh 222, while the location of a cell in which the point is located may be described using a second set of coordinates in second coordinate system 302. For example, a point in points 304 may have coordinates (1,1,4) using first coordinate system 300 within a cell in cells 310 having coordinates (1,1,1) using second coordinate system 302. The association of points 304 with cells 310 may be referred to as a transformation of points 304 in first coordinate system 300 to second coordinate system 302.

In this illustrative example, three-dimensional mesh 222 is comprised of cells 310. Cells 310 take the form of cubes in these illustrative examples. With the placement of points 304 into locations 306, points 304 may be present in one or more of cells 310.

Metadata 312 may be associated with locations 306 in which points 304 are present. In some cases, metadata 312 may be associated directly with points 304. In these illustrative examples, metadata 312 may include at least one of identifier 316 and attributes 317.

Identifier 316 is an identifier of a cell in cells 310 within three-dimensional mesh 222.

In these illustrative examples, attributes 317 is information about the cell based on points 304 located in the cell. Attributes 317 in metadata 312 may include implicit geometry data 318 based on points 304. In these illustrative examples, implicit geometry data 318 is an implicit geometry representation of points relative to each cell in three-dimensional mesh 222. Implicit geometry data 318 may be values that are based on the relationship of points located within a cell or group of cells in cells 310. In this illustrative example, a group of cells is two or more cells.

Illustrative examples of implicit geometry data in attributes 317 include population 319, distance 320, and validity 321. Population 319 is a value identifying the number of points 304 located in a cell. Distance 320 is the shortest distance from a point to the center of a cell in cells 310 in three-dimensional mesh 222. Validity 321 is the collective effect of neighboring points in points 304 on a cell in cells 310 weighted by a probability distribution function to the center of the points.

In these illustrative examples, implicit geometry data 318 may be selected as attributes 317 that may be useful in identifying clusters 226 and classes 230. In other words, implicit geometry data 318 may be selected for use in forming clusters. These clusters may be used as training data for future classification calculations in some illustrative examples.

Attributes 317 also may include other information 322. Examples of other information 322 include at least one of intensity, wavelength, and other suitable information about a point or points in a cell. These attributes may identify information about each point individually in a cell or all of the points collectively in the cell.

In this illustrative example, vectors 224 in three-dimensional mesh 222 are formed as vectors of cells 310. For example, vector 326 in vectors 224 is comprised of sequential cells in cells 310 in a direction of a z-axis. In this illustrative example, a plane defined by an x-axis and a y-axis is substantially planar to the ground in scene 210. In this manner, vectors 224 are in a z-direction relative to an x-y plane.

The illustrations of imaging environment 200 and components in imaging environment 200 in FIG. 2 and FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although unmanned aerial vehicle 102 is shown in FIG. 1, platform 202 may take many different forms. Platform 202 may be, for example, without limitation, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a radio tower, a tree, a human operator, a bridge, a dam, a building, and other suitable platforms. In still other illustrative examples, image processing system 214 may be located in platform 202.

Figure 4:
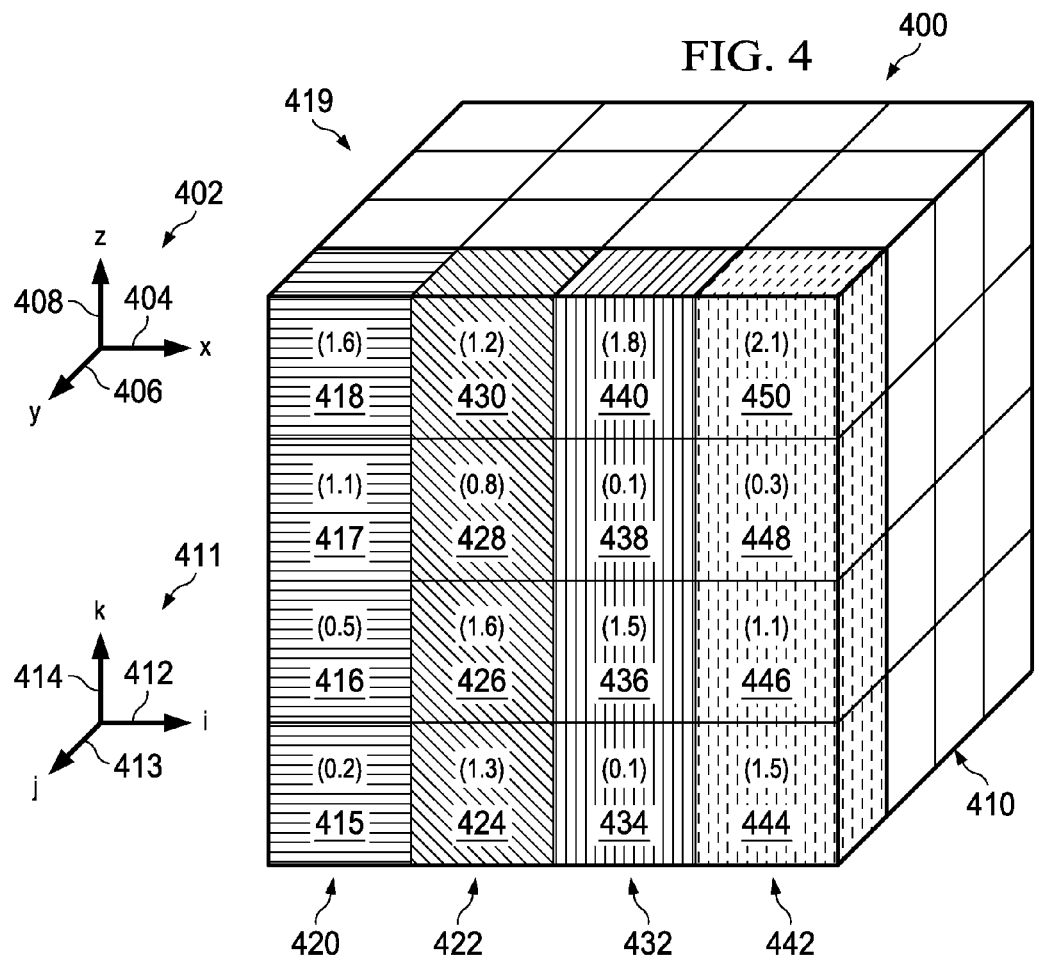
FIG. 4 is a pictorial illustration of a three-dimensional mesh in accordance with an illustrative embodiment.

With reference now to FIG. 4, a pictorial illustration of a three-dimensional mesh is depicted in accordance with an illustrative embodiment. In this illustrative example, three-dimensional mesh 400 is a pictorial illustration of a data structure. Three-dimensional mesh 400 is a pictorial illustration of three-dimensional mesh 222 in FIG. 2 and FIG. 3.

As illustrated, three-dimensional mesh 400 has coordinate system 402, which is an example of first coordinate system 300 shown in block form in FIG. 3. In this illustrative example, coordinate system 402 has x-axis 404, y-axis 406, and z-axis 408. Coordinate system 402 is the coordinate system for placing points within three-dimensional mesh 400. In these illustrative examples, coordinate system 402 may take other forms. For example, latitude, longitude, and altitude may be used in place of x-axis 404, y-axis 406, and z-axis 408 depending on the particular implementation. In other words, coordinate system 402 may be the same coordinate system used by imaging system 204 when generating point cloud 212 for image data 206.

Three-dimensional mesh 400 is comprised of cells 410. As depicted, 64 cells are present in cells 410. Points from a point cloud may be located within cells 410. In these illustrative examples, a cell within cells 410 may have no points, a single point, or a plurality of points from a point cloud.

In this illustrative example, three-dimensional mesh 400 also may have coordinate system 411. Coordinate system 411 is an example of second coordinate system 302 shown in block form in FIG. 3. Coordinate system 411 includes i-axis 412, j-axis 413, and k-axis 414. Coordinate system 411 is a coordinate system used to identify locations of cells 410 within three-dimensional mesh 400. For example, cell 415 may have coordinates of i=1, j=4, and k=1. Cell 416 may have coordinates i=1, j=4, and k=2.

In these illustrative examples, each i, j, and k coordinate has a plurality of x, y, and z coordinates that correspond to the i, j, and k coordinates. The number of x, y, and z coordinates located in the particular i, j, and k coordinates depends on the size and shape of the cell. Thus, points may be translated from a first coordinate system to a second coordinate system.

Thus, three-dimensional mesh 400 may use both coordinate system 402 and coordinate system 411 depending on the granularity. Coordinate system 402 may be used to identify locations of points within three-dimensional mesh 400 and, in particular, locations of points within cells 410. Coordinate system 411 is a less granular coordinate system and is used to identify the locations of cells 410 relative to each other.

Values may be assigned to each cell in cells 410 based on points located in the cells. These values may be examples of implicit geometry data 318 in FIG. 3. For example, cell 415 has a value of 0.2, cell 416 has a value of 0.5, cell 417 has a value of 1.1, and cell 418 has a value of 1.6.

In these illustrative examples, cells 410 may be grouped into vectors 419. Vectors 419 extend in a direction along k-axis 414. In this illustrative example, cells 415, 416, 417, and 418 form vector 420. Vector 420 is a vector in the k-direction along k-axis 414. In another example, vector 422 is comprised of cells 424, 426, 428, and 430. Cell 424 has a value of 1.3, cell 426 has a value of 1.6, cell 428 has a value of 0.8, and cell 430 has a value of 1.2.

Vector 432 includes cells 434, 436, 438, and 440. In this illustrative example, cell 434 has a value of 0.1, cell 436 has a value of 1.5, cell 438 has a value of 0.1, and cell 440 has a value of 1.8. Vector 442 includes cells 444, 446, 448, and 450. Cell 444 has a value of 1.5, cell 446 has a value of 1.1, cell 448 has a value of 0.3, and cell 450 has a value of 2.1.

Other cells in cells 410 also may include values although not shown in this example. These other cells also may be grouped into vectors in vectors 419 similar to vectors 420, 422, 432, and 442 in the k-direction along k-axis 414. In other words, this grouping of cells 410 into vectors is performed for each i and j location of cells 410.

The values in each vector form a signature. This signature may be used to identify clusters of vectors in three-dimensional mesh 400. These values may take various forms such as population 319, distance 320, validity 321, or other suitable values depending on the particular implementation.

Although the illustrative examples use coordinate system 411 to identify locations of cells 410 in three-dimensional mesh 400, other identification schemes may be used. For example, sequential unique identifiers may be used for cells 410.

Figure 5:
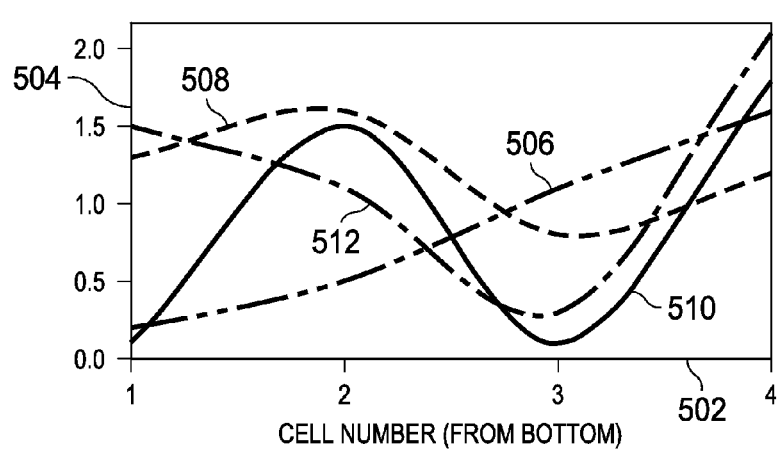
FIG. 5 is an illustration of signatures for vectors in a three-dimensional mesh in accordance with an illustrative embodiment.

Turning now to FIG. 5, an illustration of signatures for vectors in a three-dimensional mesh is depicted in accordance with an illustrative embodiment. In this illustrative example, graph 500 is a graph of signatures for vectors 420, 422, 432, and 442 in vectors 419 in FIG. 4.

X-axis 502 identifies a cell number for a vector starting with a cell number that is lowest in the k-direction along k-axis 414 in three-dimensional mesh 400. Y-axis 504 represents a value for implicit geometry data identified for the cells.

In this illustrative example, line 506 corresponds to vector 420, line 508 corresponds to vector 422, line 510 corresponds to vector 432, and line 512 corresponds to vector 442. As can be seen, the values that form these lines form signatures for the vectors.

Thus, vectors 419 may be analyzed to group the vectors into clusters. In other words, one or more of vectors 419 may be present in a cluster for a particular object type. In these illustrative examples, vectors 419 provide geometric information about the object. Placing vectors in vectors 419 into a cluster means that those vectors in vectors 419 with similar geometric features are grouped together. For example, if vector 442 is similar to vector 432, then an assumption may be made that the two vectors are for a similar type of object and should be grouped together.

In this illustrative example, the identification of whether vectors are similar may be made by analyzing their signatures as represented by line 510 for vector 432 and line 512 for vector 442. These two lines are more similar to each other as compared to line 508 for vector 422 and line 506 for vector 420.

The manner in which comparisons are made between vectors 419 and the thresholds for how similar vectors 419 should be depends on the particular implementation. For example, input selecting the number of clusters may be used to select vectors for clusters. For example, when the number of clusters increases, the variance of dissimilarity of vectors in each cluster may be reduced.

Thus, vectors 419 in the same cluster are considered to be objects with similar geometric features. Once clusters are identified in vectors 419, these clusters may be analyzed. In particular, classifications may be made based on analyzing vectors 419 in the clusters.

The illustrations of three-dimensional mesh 400 in FIG. 4 and graph 500 in FIG. 5 are only presented as pictorial representations of three-dimensional mesh 222 and signatures for vectors 224 in FIG. 2 for purposes of explaining one or more features in the illustrative examples. Of course, three-dimensional mesh 222 may include other numbers of cells other than 64 cells. For example, three-dimensional mesh 222 may have 1,073,741,824 cells if three-dimensional mesh 222 is a mesh that is 1024×1024×1024.

Figure 6:
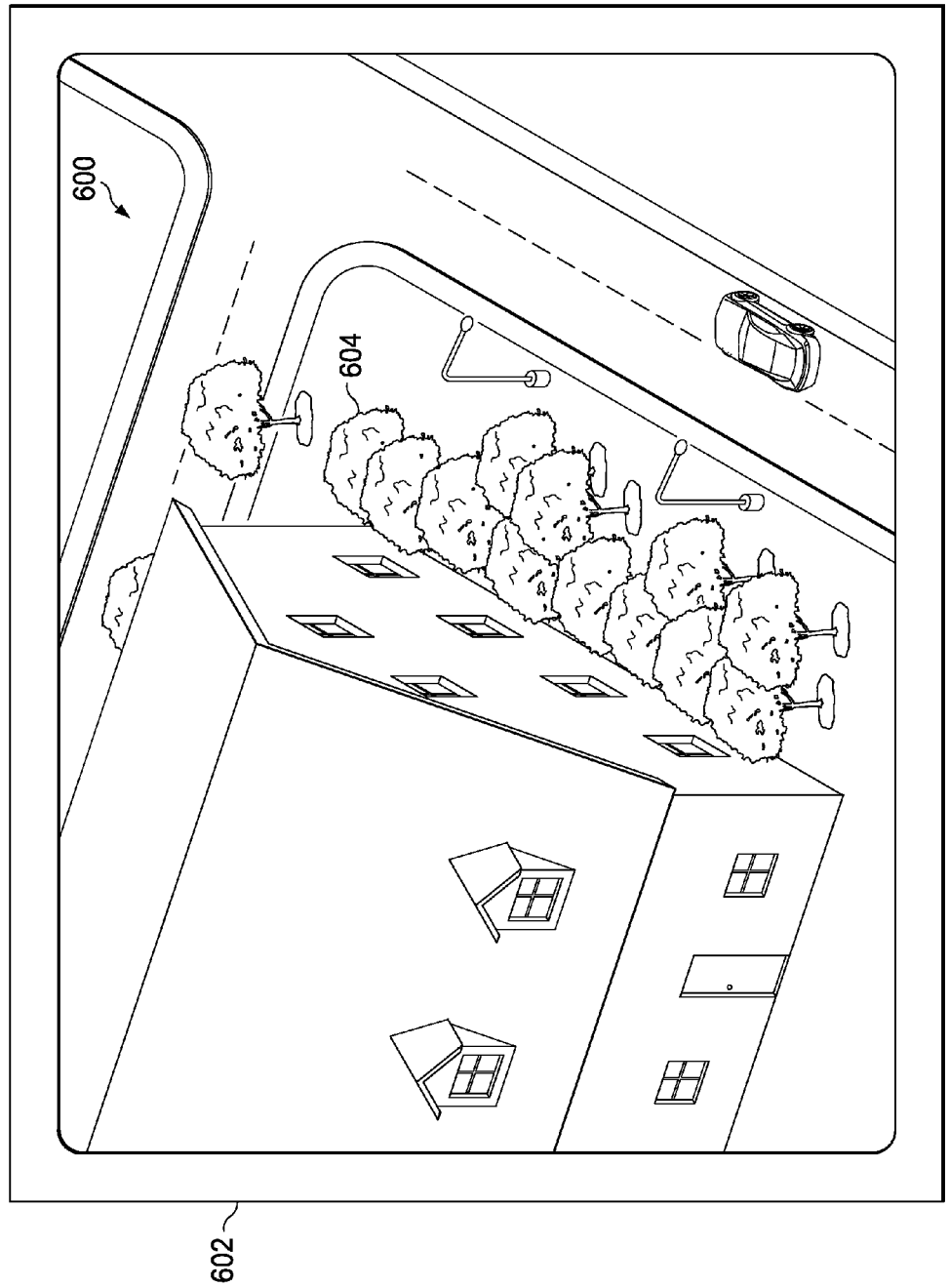
FIG. 6 is an illustration of a display of a point cloud in accordance with an illustrative embodiment.

Turning now to FIG. 6, an illustration of a display of a point cloud is depicted in accordance with an illustrative embodiment. In this illustrative example, point cloud 600 is shown in display 602. Display 602 is an example of a display that may be displayed by image processor 220 on a display device within computer system 216 in FIG. 2.

Point cloud 600 is an example of a point cloud of scene 106 in FIG. 1. Points 604 are image data for point cloud 600. In this illustrative example, each point has attributes and a coordinate identifying its location in three-dimensional space within scene 106. In this illustrative example, the coordinate is in a first coordinate system. Each point also may have attributes such as intensity, wavelength, and other suitable attributes.

In this illustrative example, points 604 are not associated with each other. Analysis of one or more points in points 604 may require processing all of points 604 to identify an object of interest in scene 106. This object of interest may be a stationary object or a moving object within scene 106. In these illustrative examples, point cloud 600 may be processed using image processor 220 in a manner that reduces the time needed to find objects and group objects in scene 106.

Figure 7:
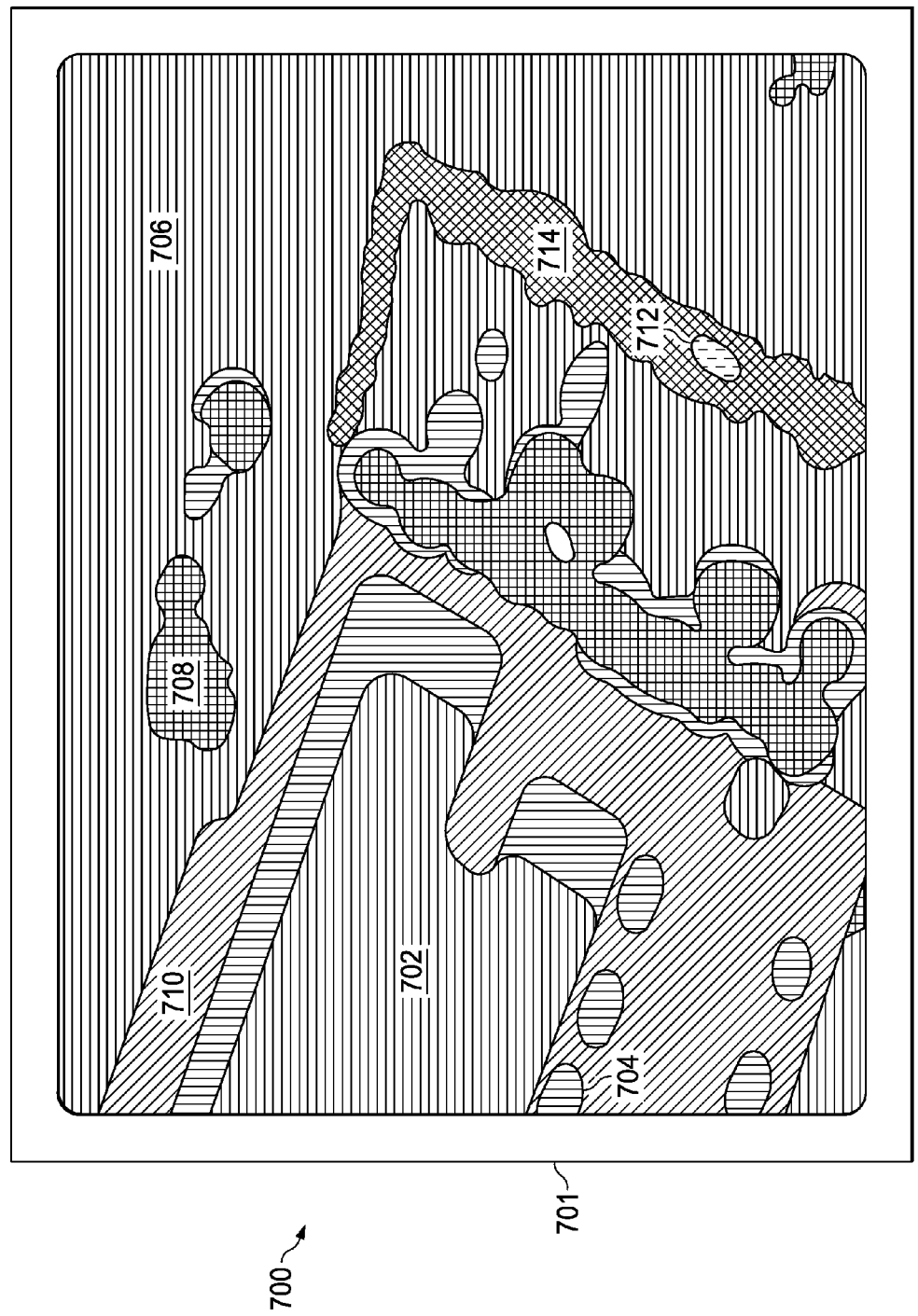
FIG. 7 is an illustration of a display of clusters in accordance with an illustrative embodiment.

Turning now to FIG. 7, an illustration of a display of clusters is depicted in accordance with an illustrative embodiment. Clusters 700 are an example of clusters 226 in FIG. 2. Display 701 is an example of a display that may be displayed on a display device by image processor 220 within computer system 216.

In this illustrative example, clusters 700 are depicted in display 701 in a top view of scene 106. In this illustrative example, clusters 700 include cluster 702, cluster 704, cluster 706, cluster 708, cluster 710, cluster 712, and cluster 714.

In this illustrative example, clusters 700 have not been identified. In some cases, more than one cluster may be part of the same object when an identification of objects in scene 106 is performed. For example, cluster 702, cluster 704, and cluster 710 may be part of house 110. Cluster 708 may be part of trees 112. Cluster 712 may be vehicle 118 with cluster 714 being road 114. Cluster 706 may be other terrain. In these illustrative examples, cluster 704 also may be part of trees 112. Thus, clusters 700 may not actually be particular objects. Further processing of clusters 700 may be performed to identify what the objects are in the illustrative examples. Thus, clusters 700 are groupings of vectors for points in a point cloud that provide information for further processing.

The illustrations of point cloud 600 in FIG. 6 and clusters 700 in FIG. 7 are only provided as illustrative examples and not meant to limit the manner in which other illustrative embodiments may be implemented. For example, other numbers of clusters may be identified from point cloud 600. For example, six, ten, or some other number of clusters may be identified depending on points 604 in point cloud 600.

Further, in some illustrative examples, point cloud 600 and clusters 700 may not be displayed by image processor 220. These displays may be presented using other components or may not be necessary.

Figure 8:
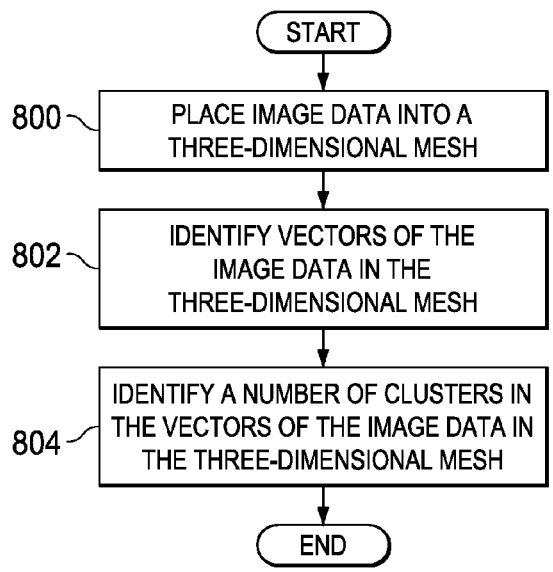
FIG. 8 is an illustration of a flowchart of a process for processing image data in accordance with an illustrative embodiment.

With reference now to FIG. 8, an illustration of a flowchart of a process for processing image data is depicted in accordance with an illustrative embodiment. The process illustrated in FIG. 8 may be implemented in imaging environment 200 in FIG. 2. In particular, the process may be implemented using image processing system 214.

The process begins by placing image data into a three-dimensional mesh (operation 800). Placing the image data into the three-dimensional mesh includes placing points from the point cloud in the image data into locations in cells. In operation 800, placing the image data into the three-dimensional mesh may include assigning the implicit geometry data to cells in the three-dimensional mesh and generating implicit geometry data for the cells.

Next, the process identifies vectors of the image data in the three-dimensional mesh (operation 802). In operation 802, these vectors may be vectors of cells in which the image data was placed and transformed into implicit geometry data for the cells. The process then identifies a number of clusters in the vectors of the image data in the three-dimensional mesh (operation 804), with the process terminating thereafter.

With the number of clusters identified in operation 804, the object represented by a cluster is unknown at this point in time. For example, whether a cluster is a tree or a car is not known for the vectors in the cluster. What is known, however, is that the clusters are different from each other. As a result, these clusters may be used to speed up object identification. For example, a class may be assigned to each of the number of clusters using an object classification algorithm.

For example, one or more vectors may be analyzed to identify the probability that those clusters are for a particular object. This process may be referred to as labeling. The label may not provide an identification of the object. After a cluster is labeled, classes can be defined by one cluster or a group of clusters. These classes are identifications of the object. For example, a class may be a tree, a building, a person, or some other suitable type of object. Feature vectors then can be extracted from classes and new vectors may be compared to the feature vectors to determine a class for the new vectors.

Figure 9:
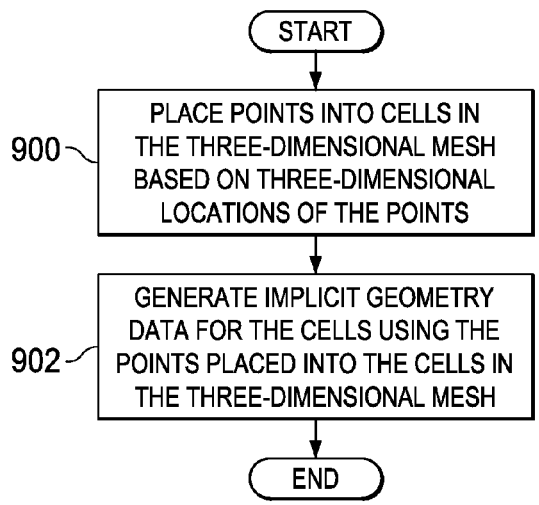
FIG. 9 is an illustration of a flowchart of a process for processing clusters of vectors of image data in accordance with an illustrative embodiment.

Turning now to FIG. 9, an illustration of a flowchart of a process for processing clusters of vectors of image data is depicted in accordance with an illustrative embodiment. The process illustrated in FIG. 9 is an example of an implementation of operation 800 in FIG. 8. In this illustrative example, the image data comprises points 304 in point cloud 212.

The process begins by placing points into cells in the three-dimensional mesh based on three-dimensional locations of the points (operation 900). In this illustrative example, the three-dimensional mesh may use the same coordinate system as the image data for placing the points into the three-dimensional mesh. In addition, the three-dimensional mesh also may include a second coordinate system used to identify the locations of cells relative to each other.

The process generates implicit geometry data for the cells using the points placed into the cells in the three-dimensional mesh (operation 902), with the process terminating thereafter. In operation 902, the implicit geometry data may include at least one of population 319, distance 320, validity 321, and other types of implicit geometry data that may be useful for identifying clusters of vectors. After the implicit geometry data is generated for the cells, processing of three-dimensional mesh 222 may occur using second coordinate system 302 that identifies locations of cells relative to each other. At this point in time, the points and their locations in the cells are not needed for performing clustering operations.

Figure 10:
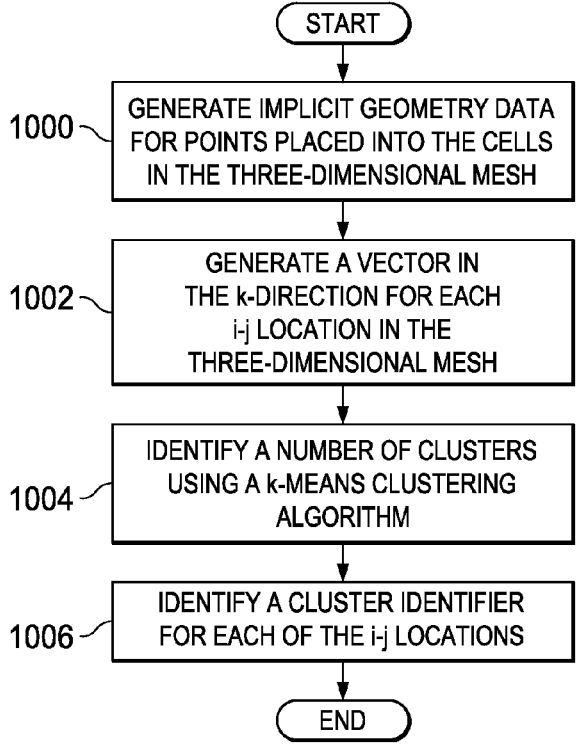
FIG. 10 is an illustration of a flowchart of a process for processing image data in accordance with an illustrative embodiment.

Turning now to FIG. 10, an illustration of a flowchart of a process for processing image data is depicted in accordance with an illustrative embodiment. The process illustrated in FIG. 10 may be implemented in image processing system 214 in FIG. 2. In particular, the process may be implemented in image processor 220.

The process begins by generating implicit geometry data for points placed into the cells in the three-dimensional mesh (operation 1000). In operation 1000, values for the implicit geometry data may be assigned to the cells. The process then generates a vector in the k-direction for each i-j location in the three-dimensional mesh (operation 1002). In operation 1002, each vector may have implicit geometry data that forms a signature for the vector. In operation 1002, the vector in the k-direction is a vector of cells extending in the k-direction from an i-j location.

The process then identifies a number of clusters using a k-means clustering algorithm (operation 1004). Of course, in other illustrative examples, any clustering algorithm may be used in operation 1004 in place of the k-means clustering algorithm in other examples.

The process then identifies a cluster identifier for each of the i-j locations (operation 1006) with the process terminating thereafter. In operation 1006, vectors in the same cluster will have the same identifier. The identifiers in the illustrative examples may not indicate an identity or identification of an object. An identifier may merely indicate that the clusters may be part of the same object or type of object. These clusters may then be used to perform operations to identify objects.

Figure 11:
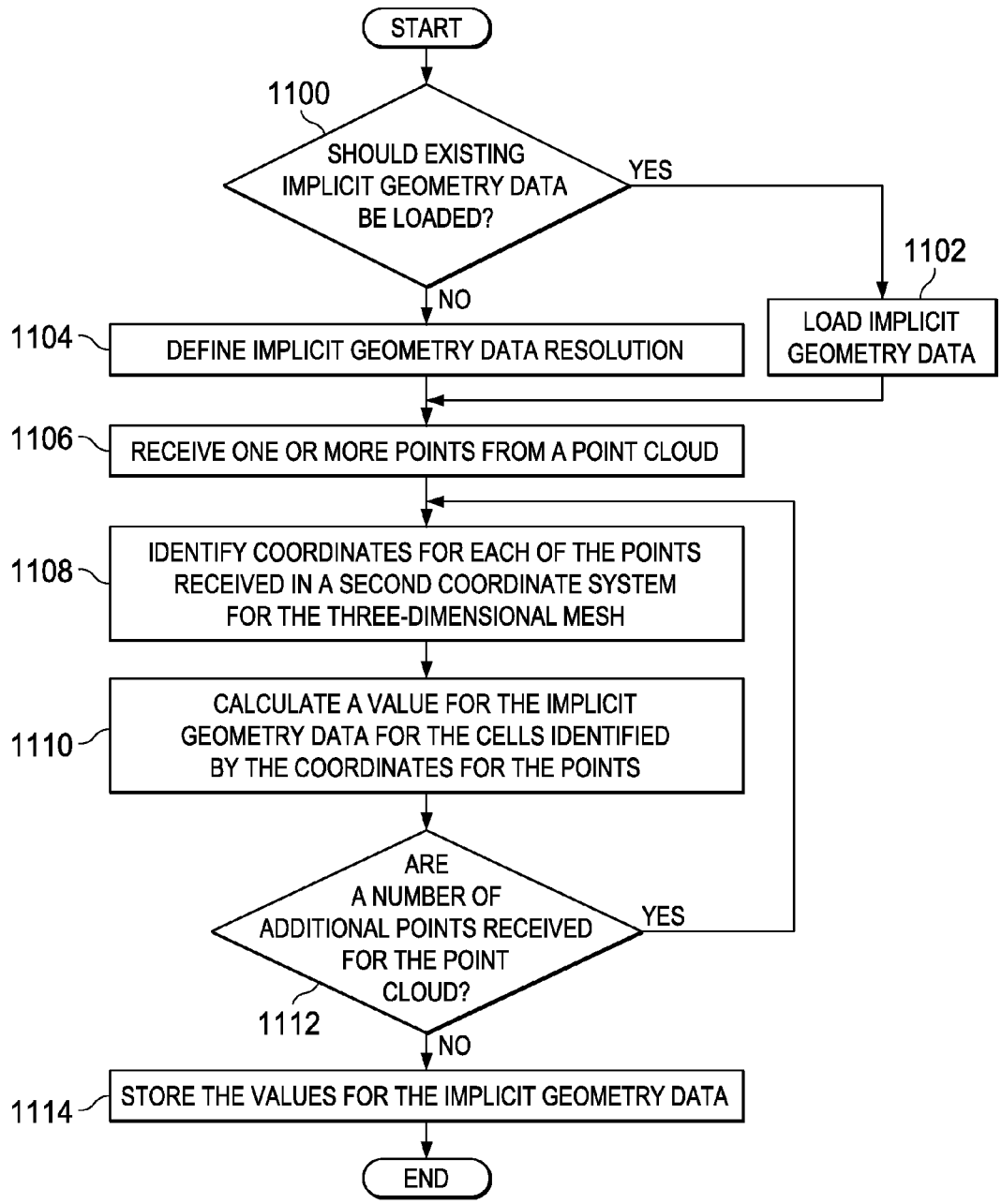
FIG. 11 is an illustration of a flowchart of a process for generating implicit geometry data in accordance with an illustrative embodiment.

Turning now to FIG. 11, an illustration of a flowchart of a process for generating implicit geometry data is depicted in accordance with an illustrative embodiment. The process illustrated in FIG. 11 is an implementation of operation 1000 in FIG. 10.

The process begins by determining whether to load existing implicit geometry data (operation 1100). In some illustrative examples implicit geometry data may be generated ahead of time and stored in a database. This existing implicit geometry data may be loaded from the database and processed at a later time.

If an existing implicit geometry data is to be loaded, the implicit geometry data is loaded (operation 1102). Otherwise, if existing implicit geometry data is not to be loaded, then an implicit geometry data resolution is defined (operation 1104). In operation 1104, the implicit geometry data resolution may be defined as a cell size in the three-dimensional mesh.

In either case, the process then proceeds to receive one or more points from a point cloud (operation 1106). In this illustrative example, the points are three-dimensional data points in a point cloud and may be received in batched or streaming fashion. With streaming, the points may be sent as the imaging system generates the points. With batching, the points may be sent by the imaging system some period of time after the points are generated.

In operation 1106, these three-dimensional data points may be points in point cloud 212 stored in data repository 218 in FIG. 2. Of course, other three-dimensional data points may be processed in addition to or in place of points in point cloud 212.

The process identifies coordinates for each of the points received in a second coordinate system for the three-dimensional mesh (operation 1108). In operation 1108, the translation from the first coordinate system to the second coordinate system identifies in which cell a point is located. The first coordinate system may be first coordinate system 300 and the second coordinate system may be second coordinate system 302 in FIG. 3.

Next, the process calculates a value for the implicit geometry data for the cells identified by the coordinates for the points (operation 1110).

A determination is made as to whether a number of additional points are received for the point cloud (operation 1112). If a number of additional points are received, the process returns to operation 1108.

In operation 1112, if a number of additional points are not received, the process stores the values for the implicit geometry data (operation 1114) with the process terminating thereafter. Otherwise, the process returns to operation 1108. In this example, these values may be stored as metadata for cells in the three-dimensional mesh that describe points that may be located in those cells.

Turning now to FIG. 12, an illustration of a flowchart of a process for generating implicit geometry data is depicted in accordance with an illustrative embodiment. The process illustrated in FIG. 12 is an example of an implementation for operation 902 in FIG. 9, operation 1000 in FIG. 10, and operation 1110 in FIG. 11.

The process begins by identifying points for processing (operation 1200). The process then selects an unprocessed point in the points (operation 1202). The process then identifies a cell in which the unprocessed point is located and identifies neighboring cells to the identified cell (operation 1204).

The population value for the cell identified as containing the point is updated (operation 1206). The process then identifies the coordinates of the point (operation 1208). Next, distances are calculated to each of the cells (operation 1210). In operation 1210, the distance is calculated from the location of the point to the center of the cell identified as containing the point and to the center of each neighboring cell.

The process then updates the distance value for each of the cells (operation 1212). These cells include the cell identified as including the point and any neighboring cells. The distance for each cell is updated to reflect the shortest distance. Thus, if the new point has a shorter distance to the center of the cell, that value is used in place of the current value of the distance.

A determination is then made as to whether additional unprocessed points are present (operation 1214). If additional unprocessed points are present, the process returns to operation 1202. Otherwise, the process terminates.

Turning now to FIG. 13, an illustration of a flowchart of a process for identifying a cell in which a point is located and any neighboring cells to the cell in which the point is located is depicted in accordance with an illustrative embodiment. The process illustrated in FIG. 13 is an example of an implementation for operation 1204 in FIG. 12. In particular, this process identifies a cell in which a point is located and also may identify any neighboring cells to the cell in which the point is located.

The process begins by identifying coordinates in the first coordinate system for the point (operation 1300). In operation 1300, these coordinates may be, for example, (x,y,z). Thereafter, the process identifies the cell in which the point is located (operation 1302). In operation 1302, the cell is identified based on a resolution identifying the size of the cells in the three-dimensional mesh. The resolution may be, for example, dx=resolution in x, dy=resolution in y, and dz=resolution in z. Thus, a cell may encompass a plurality of coordinates in the first coordinate system.

The location of the point within the three-dimensional mesh is within a cell as identified based on the resolution for the cells. The cell has coordinates (i,j,k) that are used to identify the location of the cell relative to other cells in the three-dimensional mesh.

The process then identifies neighboring cells (operation 1304) with the process terminating thereafter. Neighboring cells may be cells that are adjacent to or within some distance of the cell identified as containing the point that is being processed. Neighboring cells may be identified as follows:

$$nc=(i-t \leq i+t, j-t \leq j+t, k-t \leq k+t),$$

where nc is the coordinates for the neighboring cells, i is the coordinate on the i-axis for the cell in which the point is located, j is the coordinate on the j-axis for the cell in which the point is located, k is the coordinate on the k-axis for the cell in which the point is located, and t is the threshold value identifying a radius around the cell.

Turning now to FIG. 14, an illustration of a data processing system is depicted in accordance with an illustrative embodiment. Data processing system 1400 may be used to implement computer system 216 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communication framework may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426.

In these illustrative examples, computer readable storage media 1424 is a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1400 are not meant to provide architectural limitations to the manner in which different embodiments may be implemented. The different illustrative embodiments may be implemented in a data processing system including components in addition to and/or in place of those illustrated for data processing system 1400. Other components shown in FIG. 14 can be varied from the illustrative examples shown. The different embodiments may be implemented using any hardware device or system capable of running program code 1418.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order as noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in some illustrative examples, operation 900 may be omitted. Objects may be identified in operation 902 without placing them into classifications.

Thus, the illustrative embodiments provide a method and apparatus for processing image data. For example, the illustrative embodiments group points in a point cloud into clusters more efficiently than current processes. The different points may be placed into a three-dimensional mesh in which vectors are identified. The vectors may be placed into a number of clusters. This number of clusters may represent objects. In particular, each cluster may be part of an object. In some cases, more than one cluster may be part of the same object. With these clusters, identifications of objects, selections of objects for tracking, and other operations may be performed.

Thus, with one or more illustrative embodiments, image data, such as points in a point cloud, may be more quickly processed. One or more of the illustrative embodiments provide an ability to associate points in a point cloud through the use of vectors of cells with values identified based on the locations of points. These vectors are placed into clusters. These clusters may be used in classifying objects and processing new vectors.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An image processing system comprising:
a data repository, including at least one storage device on a computer system, configured to store image data comprising points in a point cloud; and
an image processor and program code, which when executed perform operations on the image data, including:
placing the image data into a three-dimensional mesh, comprising:
placing points into a number of cells in the three-dimensional mesh based on three-dimensional locations of the points; and
generating implicit geometry data for the number of cells using the points placed into the number of cells, implicit geometry data being one of a representation of points relative to each of the number of cells in the three-dimensional mesh and values based on the relationship of points located within the number of cells, wherein the three-dimensional mesh comprises metadata including attributes comprising one or more of population, distance, and validity;
identifying vectors of the image data in the three-dimensional mesh, wherein each vector of the vectors comprises a corresponding vertical array of single cells in the three dimensional mesh;
identifying clustering data using the vectors, wherein the clustering data comprises a plurality of clusters;
assigning a label to each of the plurality of clusters based on a probability that a given cluster represents a given object;
thereafter defining classes by one or more of the plurality of clusters, the classes comprising identifications of the given object;
extracting feature vectors from the classes and comparing additional vectors to the feature vectors to determine corresponding classes for the additional vectors; and
generating an image using the feature vectors and the corresponding classes for the additional vectors.

2. The image processing system of claim 1, further including at least one of a light detection and ranging (LIDAR) system and a laser detection and ranging (LADAR) system, wherein LIDAR systems and LADAR systems include at least one of adjustable wavelength illuminators, lasers, light sources, incoherent scanners, coherent scanners, detectors, and sensors, wherein illuminators, detectors, and sensors include at least one of direct imaging, backscattering imaging, fluorescence, Rayleigh, Mie, and Raman scattering.

3. The image processing system of claim 1, wherein the attributes comprising one or more of population, distance, and validity, further comprises:
population identifying the number of points located in the first cell;

distance defining the shortest distance from a point to a center of the first cell in the number of cells in the three-dimensional mesh; and validity equaling the collective effect of neighboring points in the number of points on the first cell in the number of cells weighted by a probability distribution function to the center of the points.

4. The image processing system of claim 1, wherein the clustering data includes an object of interest identified by the image processor using the number of clusters identified in the vectors.

5. The image processing system of claim 4, wherein the object of interest is a moving object.

6. The image processing system of claim 1, wherein the image processor is configured to identify the number of clusters in the vectors of the image data using a clustering algorithm selected from one of a k-means clustering algorithm, a hierarchical clustering algorithm, a bi-clustering algorithm, and an expectation-maximization algorithm.

7. The image processing system of claim 1, wherein the vectors are in a z-direction relative to an x-y plane.

8. The image processing system of claim 7, wherein in being configured to place the image data into the three-dimensional mesh, the image processor is configured to receive the image data from an imaging system, the image data defined by three-dimensional coordinates in a first coordinate system and associated with locations in the three-dimensional mesh in a second coordinate system, wherein the first coordinate system identifies a particular location where a particular point in a plurality of points in a point cloud is located in the three-dimensional mesh, and the second coordinate system is less granular than the first coordinate system and identifies locations of cells relative to each other.

9. The image processing system of claim 8, wherein the clustering data includes grouping a number of the vectors into a cluster in the number of clusters based on a probability that the image data in the number of the vectors is part of a same object.

10. The image processing system of claim 1, wherein the image data is a point cloud of a scene with a number of objects.

11. A method for processing image data, the method comprising:

placing, by an image processor, the image data into a three-dimensional mesh, wherein the image data comprises points in a point cloud and placing the image data into a three-dimensional mesh further comprises:

placing points into a number of cells in the three-dimensional mesh based on three-dimensional locations of the points; and generating implicit geometry data for the number of cells using the points placed into the number of cells, implicit geometry data being one of a representation of points relative to each of the number of cells in the three-dimensional mesh and values based on the relationship of points located within the number of cells, wherein the three-dimensional mesh comprises metadata including attributes comprising one or more of population, distance, and validity;

identifying, by the image processor, vectors of the image data in the three-dimensional mesh, wherein each vector of the vectors comprises a corresponding vertical array of single cells in the three-dimensional mesh;

identifying clustering data using the vectors; and generating an image using the clustering data, wherein the clustering data includes a number of clusters in the vectors of the image data in the three-dimensional mesh associated with types of objects, the types of objects identified to a class by a classifier.

12. The method of claim 11, wherein the attributes comprising one or more of population, distance, and validity, further comprises:

population identifying the number of points located in the first cell;

distance defining the shortest distance from a point to a center of the first cell in the number of cells in the three-dimensional mesh; and validity equaling the collective effect of neighboring points in the number of points on the first cell in the number of cells weighted by a probability distribution function to the center of the points.

13. The method of claim 11 further comprising:

identifying an object of interest using the number of clusters identified in the vectors of the image data included in the clustering data.

14. The method of claim 13, wherein the object of interest is a moving object.

15. The method of claim 11 further comprising:

identifying the number of clusters in the vectors of the image data using a clustering algorithm selected from one of a k-means clustering algorithm, a hierarchical clustering algorithm, a bi-clustering algorithm, and an expectation-maximization algorithm.

16. The method of claim 11, wherein the vectors are in a z-direction relative to an x-y plane.

17. The method of claim 16, wherein placing the image data into the three-dimensional mesh comprises receiving the image data from an imaging system, the image data defined by three-dimensional coordinates in a first coordinate system and associated with locations in the three-dimensional mesh in a second coordinate system, wherein the first coordinate system identifies a particular location where a particular point in a plurality of points in a point cloud is located in the three-dimensional mesh, and the second coordinate system is less granular than the first coordinate system and identifies locations of cells relative to each other.

18. The method of claim 17, wherein identifying clustering data, includes grouping a number of the vectors into a cluster in the number of clusters based on a probability that the image data in the number of the vectors is part of a same object.

19. The method of claim 11, wherein the image data is a point cloud of a scene with a number of objects.

20. The method of claim 11, wherein the clustering data includes a number of clusters in the vectors of the image data in the three-dimensional mesh associated with types of objects, the types of objects identified to a class by a classifier.

* * * * *